United States Patent [19]

Herrick et al.

[11] Patent Number: 5,390,775
[45] Date of Patent: Feb. 21, 1995

[54] MODULAR ROLLER MAT AND ROLLER ASSEMBLY

[75] Inventors: William H. Herrick, Livonia; Ronald J. Vermeulen, Birmingham; Robert S. Plue, Livonia, all of Mich.

[73] Assignee: AAR Corp., Elk Grove Village, Ill.

[21] Appl. No.: 140,667

[22] Filed: Oct. 21, 1993

[51] Int. Cl.⁶ .............................................. B65G 13/00
[52] U.S. Cl. ................. 193/35 R; 193/35 MD
[58] Field of Search ............ 198/780, 782; 193/35 R, 193/35 MD; 244/137.1

[56] References Cited

U.S. PATENT DOCUMENTS

| | | | |
|---|---|---|---|
| 2,917,148 | 12/1959 | Rath | 193/35 R |
| 2,964,155 | 12/1960 | Flowers et al. | 193/35 R |
| 3,509,978 | 5/1970 | Bedford | 193/35 R |
| 3,763,980 | 10/1973 | Vom Stein et al. | 193/35 R |
| 4,784,194 | 11/1988 | Danner | 193/35 MD X |
| 5,033,601 | 7/1991 | Huber | 193/35 MD |
| 5,219,057 | 6/1993 | Sundseth | 193/35 MD |
| 5,219,058 | 6/1993 | Sundseth | 193/35 MD |

FOREIGN PATENT DOCUMENTS

| | | | |
|---|---|---|---|
| 2366190 | 6/1978 | France | 193/35 R |
| 1296088 | 5/1969 | Germany | 193/35 R |
| 0902864 | 8/1962 | United Kingdom | 193/35 R |
| 2029354 | 3/1980 | United Kingdom | 193/35 R |

OTHER PUBLICATIONS

Sheet A–Drawing of ball Matt Assembly.
Sheet B–Drawing of Ball Tray Assembly.
Sheet C–Drawing of Ball Mat Assembly.
Sheet D–Drawing of Ball Mat Assembly.
Ancra Corporation "Ball Transfer Unit" advertising literature.

*Primary Examiner*—James R. Bidwell
*Attorney, Agent, or Firm*—Lee, Mann, Smith, McWilliams, Sweeney and Ohlson

[57] ABSTRACT

A modular roller mat for providing rolling movement of cargo units over the floor of a cargo deck. The roller mat comprises a plurality of interconnected roller tray assemblies. Each roller tray assembly comprises a tray and a plurality of modular roller assemblies including a housing and a roller unit. The tray includes a floor, a first side wall, a second side wall and a flange extending inwardly from each side wall. The housing includes a plate and a downwardly extending collar. The plate extends between the side walls of the tray and is removably attached to the flanges of the tray. The collar includes an annular sleeve through which the roller unit is inserted. The roller unit includes a rotatable retainer member. Once inserted, the roller unit retainer is rotated such that retaining lugs on the roller unit retainer engage the sleeve to retain the roller unit in the housing. The roller assemblies are easily removed and replaced in the tray and are interchangeable with one another.

16 Claims, 2 Drawing Sheets

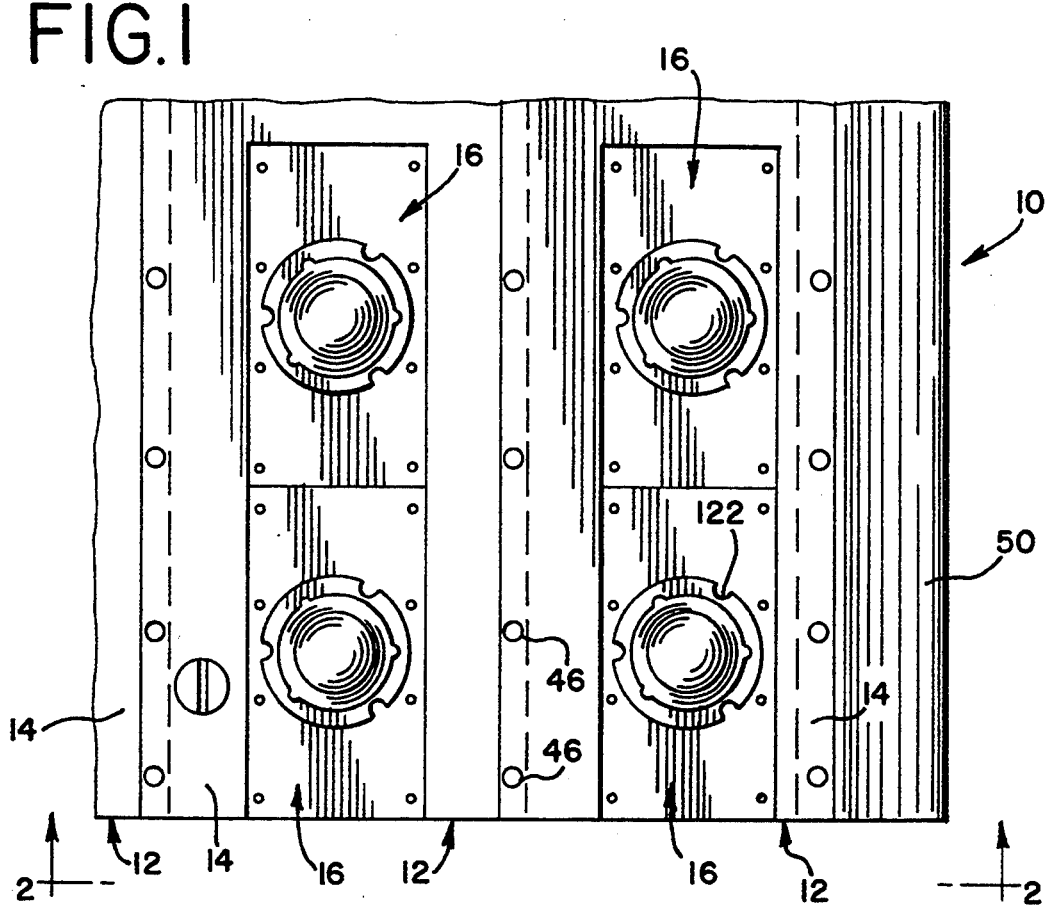
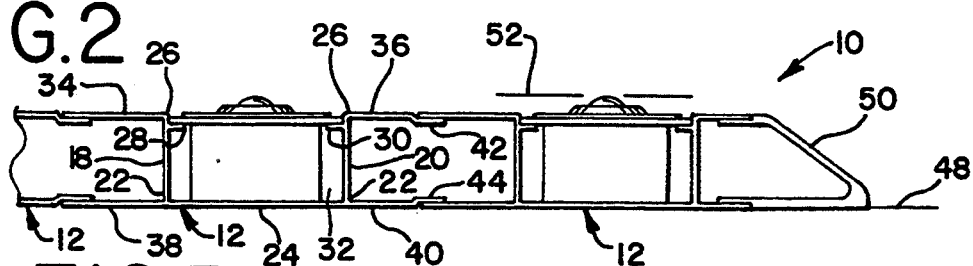
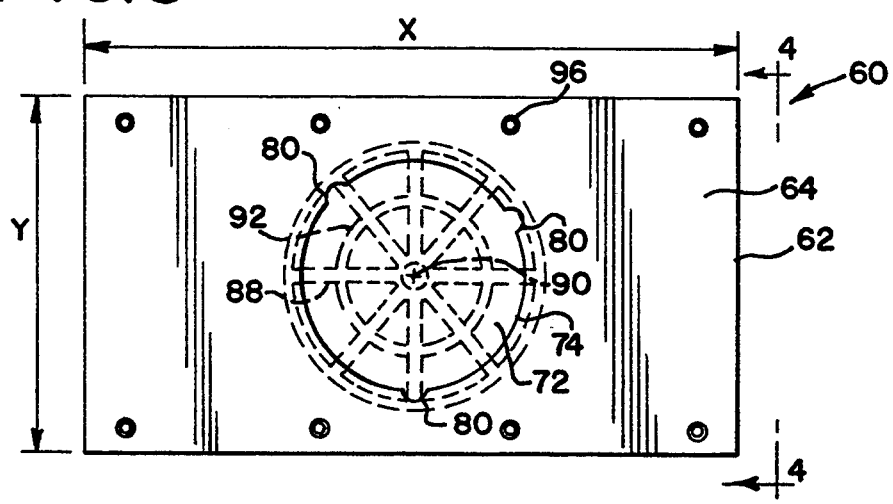

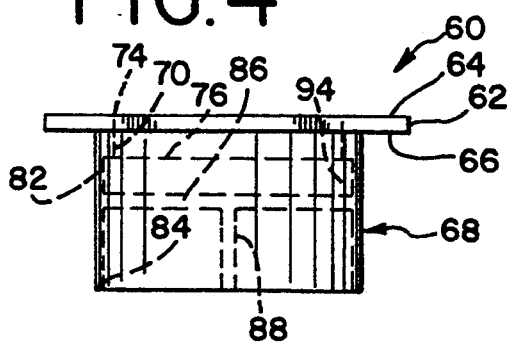
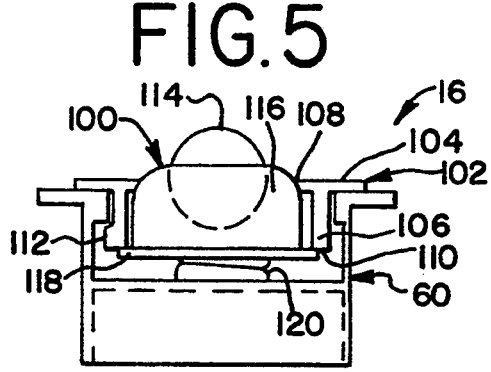
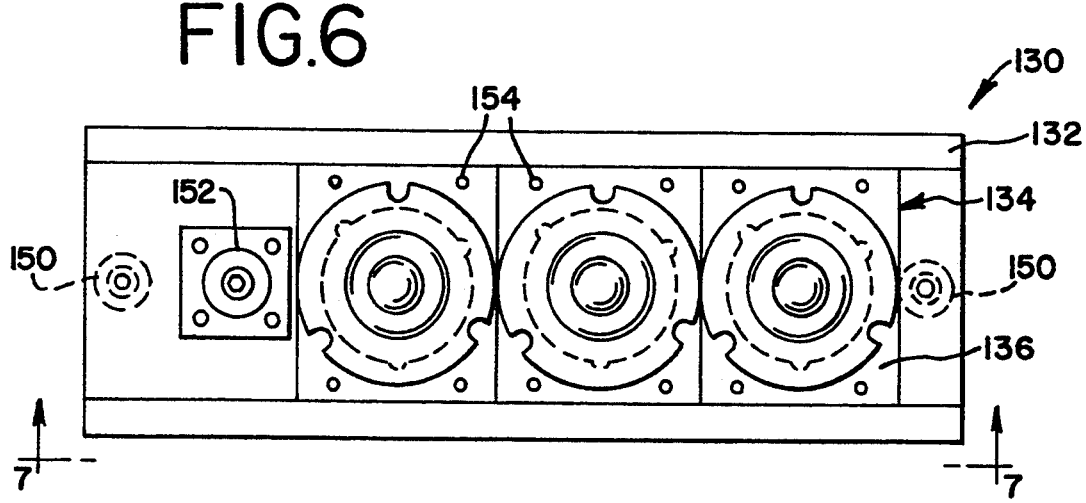
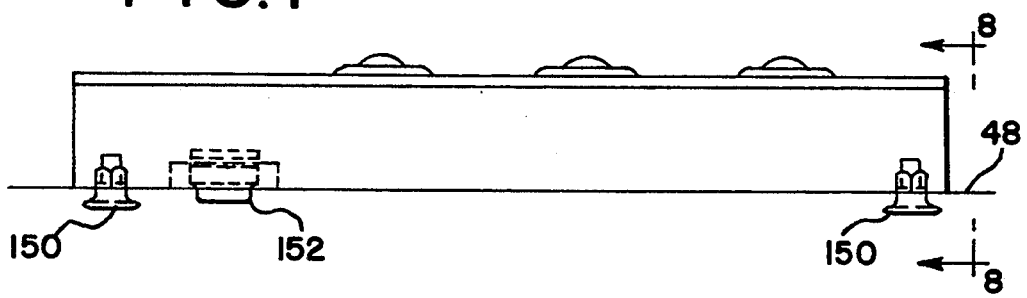
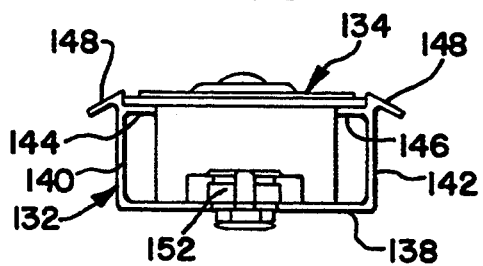

MODULAR ROLLER MAT AND ROLLER ASSEMBLY

BACKGROUND OF THE INVENTION

This invention relates to roller conveyors used to provide rolling movement of cargo over the floor of a cargo deck, and in particular to modular roller trays and roller housings.

Roller or ball mats have been used on cargo deck floors in aircraft to provide rolling movement of cargo carrying units such as cargo containers or pallets from the aircraft doorway to the cargo unit's final loaded position. Prior roller mats include an extruded frame in which a plurality of rotatable roller elements are mounted. However, the roller elements and their mounting mechanisms often become damaged during use and fail to operate properly. Prior roller mats require substantial disassembly in order to repair or replace individual roller units which have failed.

U.S. Pat. No. 3,763,980 discloses an assembly set for erecting roller conveyors. Each assembly set is connected to an adjacent assembly set by connector members disposed in the side walls of the assembly sets. In this fashion, a ball mat is constructed by interlinking a series of assembly sets.

The present invention provides a modular roller mat having lower maintenance and lower manufacturing costs than former designs. The roller mat is comprised of a plurality of interconnected trays with each tray including a plurality of individual roller assembly units. The roller assembly units are interchangeable with one another and are easily removed and replaced in a tray. If a roller assembly unit fails it may be replaced by another unit with minimum downtime. Furthermore, the consistency between the modular roller assembly units offers cost advantages through economies of scale and a reduction of the inventory required to support an aircraft or other location where the roller mats are employed to transport cargo.

SUMMARY OF THE INVENTION

The present invention is a modular roller mat for placement on the floor of a cargo carrying deck of an aircraft to provide an upper support surface over which cargo carrying units such as containers or pallets may be rolled. The roller mat may also be used on ship decks, truck beds, floors of train cars and buildings, and any other surface over which cargo is transported. The roller mat comprises a plurality of roller tray assemblies which are connected one to another in any desired arrangement.

Each roller tray assembly comprises a tray having a floor plate, a first side wall and a second opposing side wall spaced apart from and extending parallel to the first side wall. The first and second side walls each include a top edge and a bottom edge. The first and second side walls and the tray floor plate form a hollow channel within the tray. A first flange is attached to the first side wall and extends perpendicularly inwardly therefrom toward the second side wall. A second flange is attached to the second side wall and extends perpendicularly inwardly therefrom toward the first side wall. The first and second flanges are coplanar with one another and are equally spaced downwardly from the top edges of the first and second side walls. A first top shelf extends outwardly from the top edge of the first side wall and a second top shelf extends outwardly from the top edge of the second side wall. A first bottom shelf extends outwardly from the bottom edge of the first side wall and a second bottom shelf extends outwardly from the bottom edge of the second side wall. The top and bottom shelves are adapted to overlap with the top and bottom shelves of an adjacent tray such that the adjacent trays may be connected together with fasteners to form a mat.

At least one roller assembly is located in the channel of each tray. Each roller assembly includes a housing and a roller unit. Each housing includes a plate having a top surface and a bottom surface. The plate extends between the first and second side walls of the tray with the bottom surface of the plate bearing on the first and second flanges of the tray. A collar is connected to and extends downwardly from the plate of the housing. The collar includes a sleeve having an upper rim and a lower rim which forms an aperture through the plate of the housing. A peripheral wall extends downwardly from the sleeve. The housing includes a plurality of vertical concave grooves which extend through the plate and the sleeve of the housing. A bottom wall extends transversely within the peripheral wall of the housing and is spaced apart from the sleeve. The housing is removably attached to the tray by fasteners which extend through the top plate of the housing and the flanges of the tray. The housings mounted in each tray are interchangeable with one another and are removable and replaceable in each tray in a modular manner.

A roller unit is located in the chamber of each housing. Each roller unit includes a retainer having an annular flange and an aperture extending through the flange. A cylindrical ring is attached to the bottom of the flange and includes a plurality of outwardly extending lugs at the bottom edge of the ring. The roller unit also includes a spherical or cylindrical roller rotatably mounted in a casing. The casing includes an upper aperture through which the roller partially extends. The casing also includes an outwardly extending flange. The roller is rotatably supported on a bearing assembly within the casing which includes a plurality of bearings and a bearing race. The lugs of the retainer are slidable through and within the grooves in the housing. Once the lugs are slid through the grooves, the retainer is rotated such that the lugs engage the sleeve of the housing to thereby retain the retainer in connection with the housing. The roller and casing project partially through the aperture in the retainer. A spring extends between the bottom wall of the housing and the casing to resiliently bias the casing and roller upwardly such that the flange of the casing engages the rim of the ring in the retainer member. Each roller assembly may be individually removed easily and quickly from a tray and replaced with a corresponding roller assembly without removing the roller unit from the housing.

BRIEF DESCRIPTION OF THE DRAWINGS

The invention is described in greater detail in the following description of examples embodying the best mode of the invention, taken in conjunction with the drawing figures, in which:

FIG. 1 is a partial top plan view of a plurality of roller tray assemblies according to the present invention assembled as a modular roller mat.

FIG. 2 is an end view of the roller mat taken along lines 2—2 of FIG. 1.

FIG. 3 is a top plan view of a roller housing according to the present invention, without an installed roller unit.

FIG. 4 is an end elevational view of the housing taken along lines 4—4 of FIG. 3.

FIG. 5 is a partial cross-sectional view of a roller assembly according to the present invention including an assembled housing and roller unit.

FIG. 6 is a top plan view of a second embodiment of a roller tray assembly according to the present invention.

FIG. 7 is a side elevational view of the second embodiment of the roller tray assembly taken along lines 7—7 of FIG. 6.

FIG. 8 is an end view of the second embodiment of the roller tray assembly taken along lines 8—8 of FIG. 7.

DESCRIPTION OF EXAMPLES EMBODYING THE BEST MODE OF THE INVENTION

The roller mat 10 of the present invention includes a plurality of roller tray assemblies 12 as best shown in FIGS. 1 and 2. Each roller tray assembly 12 includes a tray 14 and a plurality of roller assemblies 16. Each tray 14 includes a first vertical side wall 18 and an opposed second vertical side wall 20. Each side wall 18 and 20 is attached at a bottom edge 22 to a floor plate 24 and extends vertically to a top edge 26. The first and second side walls 18 and 20 extend parallel to one another and perpendicular to the floor plate 24. A first flange 28 is attached to the first side wall 18 and extends inwardly and perpendicular therefrom towards the second side wall 20. The first flange 28 is spaced downwardly from and extends parallel to the top edge 26 of the first side wall 18. A second flange 30 is attached to the second side wall 20 and extends inwardly and perpendicular therefrom towards the first side wall 18. The second flange 30 is spaced downwardly from and extends parallel to the top edge 26 of the second side wall 20 and is coplanar with the first flange 28. The floor plate 24 and the first and second side walls 18 and 20 form a hollow channel 32 within the tray 14. The first and second flanges 28 and 30 form an elongate slot therebetween providing access to the channel 32.

A first top shelf 34 is attached to the first side wall 18 and extends outwardly from the top edge 26 of the first side wall 18 perpendicular to the first side wall 18. A second top shelf 36 is attached to the second side wall 20 and extends outwardly from the top edge 26 of the second side wall 20 perpendicular to the second side wall 20. A first bottom shelf 38 is attached to the first side wall 18 and extends outwardly from the bottom edge 22 of the first side wall 18 perpendicular to the first side wall 18. A second bottom shelf 40 is attached to the second side wall 20 and extends outwardly from the bottom edge 22 of the second side wall 20 perpendicular to the second side wall 20. The second top shelf 36 includes a downwardly offset edge strip 42 and the second bottom shelf 40 includes an upwardly offset edge strip 44. The edge strip 42 is adapted to extend under a first top shelf 34 of an adjacent tray 14 as shown in FIG. 2. The edge strip 44 is adapted to extend over a first bottom shelf 38 of an adjacent tray 14. Thus, adjacent trays 14 smoothly interengage. A plurality of threaded fasteners 46, such as screws or nuts and bolts or blind fasteners, may be used to releasably connect the edge strips 42 and 44 of the tray 14 to the first top shelf 34 and the first bottom shelf 38 of an adjacent tray 14.

The trays 14 can be connected to one another in various different arrangements to form a roller mat 10 which covers various different portions of a cargo deck 48 as desired. The cargo deck 48 may comprise any type of floor or other support surface. The roller mat 10 may be secured to the cargo deck 48 with tie down studs and shear studs and may include openings through which various cargo restraints and cargo guides may extend. The roller mat 10 may also include an inclined ramp 50 along each edge to finish the roller mat and facilitate the movement of cargo units to the support surface 52 of the roller mat.

Each roller assembly 16, as shown in FIG. 5, includes a housing 60 and a roller unit 100. As best shown in FIGS. 3 and 4, the housing 60 includes a rectangular top plate 62 having a top surface 64 and a bottom surface 66. The plate 62 has a length "X" and a width "Y" as shown in FIG. 3. A downwardly depending collar 68 is attached to the plate 62 and extends downwardly from and perpendicular to the bottom surface 66. The collar 68 includes a generally cylindrical sleeve 70 which extends through the plate 62 forming a generally circular aperture 72 therein. The sleeve 70 extends between an upper rim 74 and a lower rim 76. The upper rim 74 is part of the top surface 64 of the plate 62. The lower rim 76 is preferably spaced apart from and below the bottom surface 66 of the plate 62 and is generally parallel to the top surface 64 of the plate 62. A plurality of concave grooves 80 are located in the sleeve 70 and extend vertically through the sleeve 70 and the plate 62 and form pan of the aperture 72, The sleeve 70 preferably includes three of the grooves 80 spaced equidistantly from one another. Fewer or additional grooves 80 may be used as desired.

A cylindrical peripheral wall 82 extends downwardly and outwardly from the outer edge of the sleeve 70 to a circular rim 84. A bottom wall 86 extends transversely from the peripheral wall 82 and is located between the sleeve 70 and the rim 84. The bottom wall 86 is parallel to the plate 62. A plurality of reinforcing ribs 88 extend downwardly from the underside of the bottom wall 86 to a lower edge which is coplanar with the rim 84 of the peripheral wall 82. The ribs 88 extend from one side of the peripheral wall 82 to a diametrically opposite side of the peripheral wall 82. The ribs 88 are equiangularly spaced within the peripheral wall 82 about a vertical axis 90 which extends through the center of the aperture 72 and the collar 68. A plurality of arcuate reinforcing ribs 92 extend between the ribs 88 between the axis 90 and the peripheral wall 82. The bottom wall 86, the peripheral wall 82 and the sleeve 70 form a hollow chamber 94 within the housing 60. A plurality of apertures 96 extend through the plate 62. The apertures 96 are preferably countersunk at the top surface 64. The housing 60 is preferably made of a molded plastic material.

The width "Y" of the plate 62 is sized to be slightly shorter than the distance between the first side wall 18 and the second side wall 20 of the tray 14 such that the bottom surface 66 of the plate 62 will bear upon and be supported by the first and second flanges 28 and 30 of the tray 14. The length "X" of the plate 62 may be various different lengths as desired. The height of the collar 68 is sized such that the rim 84 of the peripheral wall 82 and the bottom edges of the ribs 88 will rest on the floor plate 24 of the tray 14 when the plate 62 is located on the flanges 28 and 30. Fasteners such as screws or bolts may extend through the apertures 96 in the plate 62 and through corresponding apertures in the flanges 28 and 30 to releasably secure the housing 60 to the tray 14.

Each roller assembly 16, as shown in FIG. 5, also includes a roller unit 100. The roller unit 100 includes a retainer 102 having a generally circular plate 104 and a depending ring 106. The plate 104 includes a generally circular central aperture 108. The ring 106 extends downwardly from the plate 104 and terminates in a rim 110. A plurality of spaced retaining lugs 112, only one shown, project outwardly from the lower rim 110 of the ring 106. The ring 106 is sized to fit snugly within the sleeve 70 of the housing 60. The lugs 112 are located about the perimeter of the ring 106 in registration with the grooves 80 such that each lug 112 slidingly fits within a respective groove 80 in the housing 60. The lugs 112 slide through the grooves 80 until the plate 104 bears against the plate 62 of the housing 60 whereupon the retainer 102 may be rotated about the axis 90 to engage the lugs 112 beneath the sleeve 70 so that the retainer 102 cannot be axially removed from the housing 60.

The roller unit 100 also includes a roller element 114 and a casing 116. The roller element 114 is preferably a spherical steel ball. However, the roller 114 may take on various other shapes such as a cylinder. The casing 116 includes an aperture in its upper end and an outwardly extending annular flange 118 at its lower end. The roller 114 is retained in the casing 116 and is rotatably supported therein by a conventional bearing assembly, not shown, such that the roller 114 projects partially outwardly from the casing 116. The casing 116 is adapted to extend upwardly through the aperture 108 in the retainer 102, as shown in FIG. 5, such that the support surface 52 at the top of the roller 114 is located above the plate 104 of the retainer 102. A resilient member such as a spring 120 extends between the bottom wall 86 of the housing 60 and the bottom of the casing 116. The spring 120 resiliently biases the roller unit 100 upwardly, forcing the flange 118 of the casing 116 to engage the rim 110 of the retainer 102. The plate 104 may include a plurality of concave recesses 122 (FIG. 1) formed in the outer edge of the plate 104.

In operation, a roller unit 100 is assembled with the housing 60 by inserting the ring 106 through the sleeve 70 of the housing 60 with the lugs 112 in registration with the grooves 80 and simultaneously compressing the spring 120. Once the lugs 112 have passed through the grooves 80, the retainer 102 is rotated about the axis 90 to engage the lugs 112 beneath the sleeve 70 of the housing 60. The lugs 112 thereby releasably retain the roller unit 100 in engagement with the housing 60. The spring 120 biases the casing 116 against the retainer 102 and resiliently supports the roller 114. The downward movement of the roller unit 100 and the corresponding compression of the spring 120 is limited by the distance between the flange 118 of the casing 116 and the bottom wall 86 of the housing 60.

The roller assembly 16, comprising the assembled roller unit 100 and housing 60, is assembled with a tray 14. The collar 68 of the housing 60 is inserted into the channel 32 of the tray 14 between the flanges 28 and 30. The top plate 62 of the housing 60 is placed against the flanges 28 and 30 while the rim 84 and bottom edges of the ribs 88 are placed against the floor plate 24 of the tray 14. The roller assembly 16 is removably fastened to the tray 14 by fasteners which extend through the apertures 96 in the plate 62 and through corresponding apertures in the flanges 28 and 30 of the tray 14. Any number of roller assemblies 16 may be assembled in a tray 14 and may be located in an end-to-end relationship, as shown in FIG. 1, or the roller assemblies 16 may be spaced apart from one another. The individually formed roller tray assemblies 12 may then be assembled together in various different configurations to form a roller mat 10 which extends around various obstructions such as cargo latches and guides which are attached to the cargo deck 48.

When a roller assembly 16 becomes damaged or requires any type of maintenance or repair, the fasteners may be removed from the plate 62. The damaged roller assembly 16 may then be easily and quickly removed from the tray 14 and may be modularly replaced with an identical roller assembly 16. While a damaged roller unit 100 can be individually removed from its housing 60 while the housing 60 remains connected to the tray 14, it may be preferable to remove and replace the entire roller assembly 16 including the housing 60 and roller unit 100 as the biasing force generated by the compressed spring 120 makes it difficult and time consuming to remove and replace the roller unit 100 in the housing 60. Once the damaged roller assembly 16 has been removed and replaced, the damaged roller assembly 16 can be repaired as time permits.

A second embodiment of the roller tray assembly is generally illustrated by the reference numeral 130 in FIGS. 6–8. The roller tray assembly 130 includes a tray 132 and one or more roller assemblies 134. The roller assemblies 134 are identical to the roller assembly 16 except that the top plate 136 of each roller assembly 134 is shown as being square. The tray 132 includes a floor plate 138, a first side wall 140 and a second side wall 142. The side walls 140 and 142 extend vertically from the floor plate 138 and are spaced apart and parallel to one another. A flange 144 extends inwardly from the first side wall 140 and a second flange 146 extends inwardly from the second side wall 142. An inclined shelf 148 extends outwardly and downwardly from the top edge of the first side wall 140 and from the top edge of the second side wall 142. A tray tie down stud 150 is threadably inserted into each end of the floor plate 138 for removably securing the tray 14 to the cargo deck 48. A shear stud 152 is threadably inserted into the floor plate 138.

The roller assembly 134 is removably attached to the tray 132 by a plurality of fasteners which extend through apertures 154 in the plate 136 and corresponding apertures in the flanges 144 and 146. The individually formed roller tray assemblies 130 may be attached to the cargo deck 48 in various different configurations as desired. For example, the individually formed roller tray assemblies 130 may be abutted end-to-end against one another, or side-to-side. The roller assembly 134 may be easily removed from the tray 132 by removal of the fasteners and may be replaced with an identical roller assembly 134, or can be removed in its entirety.

While a primary and preferred embodiment of the invention has been illustrated in the drawings and described above, it will be evident that various changes can be made to the invention without departing from the spirit thereof or scope of the following claims.

What is claimed is:

1. A roller tray assembly for providing rolling movement of cargo units over a cargo deck, said roller tray assembly comprising:

a tray having a first side wall and a second side wall spaced apart from and extending parallel to said first side wall, a first support member extending inwardly from said first side wall toward said second side wall, a second support member extending inwardly from said second side wall toward said first side wall, at least one housing, each said housing including a plate having a top surface and a bottom surface and an aperture extending through said plate, said plate extending between said first and second side walls of said tray and said bottom surface of said plate bearing on said first and second support members, and a roller unit located in each said housing and projecting through said aperture in said plate, each said roller unit including a casing having an aperture, means for selectively engaging said housing to retain said roller unit in engagement with said housing, and a rotatable roller element associated with said casing and projecting through said aperture in said casing for rotatably supporting a cargo unit, each said housing and roller unit being independently removable and replaceable in said tray as a unit.

2. The roller tray assembly of claim 1 wherein said first and second side walls of said tray each include a top edge and a bottom edge, said first and second support members being spaced downwardly from said top edges.

3. The roller tray assembly of claim 2 wherein said first support member comprises a first flange and said second support member comprises a second flange.

4. The roller tray assembly of claim 1 wherein said means for selectively engaging said housing comprise a plurality of lugs.

5. The roller tray assembly of claim 4 wherein said housing includes a plurality of grooves extending through said plate and forming a part of said aperture, said grooves allowing said lugs of said roller unit to slide through said plate when said lugs are in registration with said grooves.

6. The roller tray assembly of claim 5 wherein each said roller unit is rotatable within each said housing, such that rotation of said roller unit rotates said lugs out of registration with said grooves whereby said lugs engage said housing and thereby retain said roller unit in engagement with said housing.

7. The roller tray assembly of claim 1 including a first shelf extending outwardly from said first side wall and a second shelf extending outwardly from said second side wall of said tray.

8. The roller tray assembly of claim 7 wherein said first and second shelves are attachable to first and second shelves of adjacent roller tray assemblies.

9. The roller tray assembly of claim 1 including means for releasably attaching said tray to a cargo deck.

10. The roller tray assembly of claim 1 including a resilient member resiliently supporting said roller element.

11. The roller tray assembly of claim 1 wherein said housing includes a downwardly depending collar.

12. The roller tray assembly of claim 11 wherein said collar includes a sleeve extending through said plate.

13. The roller tray assembly of claim 12 wherein a plurality of grooves extend through said sleeve.

14. The roller tray assembly of claim 12 wherein said collar includes a bottom wall spaced apart from and below said sleeve.

15. The roller tray assembly of claim 1 wherein said tray includes a floor extending between said first and second side walls and said housing includes a collar extending downwardly from said plate to said floor.

16. The roller tray assembly of claim 15 wherein said housing includes a bottom wall Spaced apart from and below said plate and a plurality of ribs attached to said bottom wall of said housing, said ribs extending between said bottom wall and said floor of said tray.

* * * * *